(12) United States Patent
Yuan et al.

(10) Patent No.: US 9,391,697 B2
(45) Date of Patent: Jul. 12, 2016

(54) PROACTIVE DELAY MEASUREMENT FOR OPTICAL TRANSPORT NETWORK

(71) Applicant: Fujitsu Limited, Kanagawa (JP)

(72) Inventors: Catherine Yuan, Plano, TX (US); Vikas Mittal, Murphy, TX (US); Serdar Kiykioglu, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 308 days.

(21) Appl. No.: 13/855,544

(22) Filed: Apr. 2, 2013

(65) Prior Publication Data

US 2014/0294377 A1  Oct. 2, 2014

(51) Int. Cl.
*H04J 14/00* (2006.01)
*H04B 10/079* (2013.01)
*H04B 10/00* (2013.01)
*H04B 10/077* (2013.01)

(52) U.S. Cl.
CPC ...... *H04B 10/0775* (2013.01); *H04B 2210/072* (2013.01)

(58) Field of Classification Search
CPC .. H04B 10/0795; H04B 10/27; H04B 10/272; H04J 3/0602; H04J 3/0682; H04J 3/1694
USPC .............. 398/68–71, 59, 63, 43, 66
See application file for complete search history.

(56) References Cited

U.S. PATENT DOCUMENTS

| | | | |
|---|---|---|---|
| 2008/0089686 A1* | 4/2008 | Kazawa et al. | 398/71 |
| 2009/0317087 A1* | 12/2009 | Bernard et al. | 398/135 |
| 2011/0262129 A1* | 10/2011 | Shaffer et al. | 398/5 |
| 2012/0057865 A1* | 3/2012 | Hasegawa et al. | 398/16 |
| 2014/0294377 A1* | 10/2014 | Yuan et al. | 398/25 |

OTHER PUBLICATIONS

ITU-T G.798; "Series G: Transmission Systems and Media, Digital Systems and Networks"; Telecommunication Standardization Sector of ITU; International Telecommunications Union; pp. 384, Oct. 2010.
ITU-T G.709/Y.1331; "Series G: Transmission Systems and Media, Digital Systems and Networks" & "Series Y: Global Information Infrastructure, Internet Protocol Aspects and Next-Generation Networks"; Telecommunication Standardization Sector of ITU; International Telecommunications Union; pp. 231 Feb. 2012.

* cited by examiner

*Primary Examiner* — Oommen Jacob
(74) *Attorney, Agent, or Firm* — Baker Botts L.L.P.

(57) ABSTRACT

A network element is disclosed. In accordance with some embodiments of the present disclosure, a network element may comprise a network interface configured to communicatively couple to a network, and a controller communicatively coupled to the network interface. The controller may be configured to determine a delay-measurement interval, and to perform a plurality of delay measurements at a respective plurality of randomly determined times within the delay-measurement interval. Performing a delay measurement may comprise sending an outgoing signal, receiving an incoming signal, and determining a delay time based on the outgoing signal and the incoming signal.

15 Claims, 3 Drawing Sheets

PROACTIVE DELAY MEASUREMENT FOR OPTICAL TRANSPORT NETWORK

TECHNICAL FIELD

The present disclosure relates generally to optical networks and, more particularly, to delay measurements for optical networks.

BACKGROUND

Telecommunications systems, cable television systems, and data communication networks use communication networks to rapidly exchange large amounts of information between remote points. A communication network may include network elements that route analog or digital signals, data, including packets through the network. In an optical network, information is conveyed in the form of optical signals through optical conduits, such as fibers. Networks, including optical networks often employ redundancies to maximize performance and availability. Such redundancies may include the monitoring of a primary network path, and the switchover of network traffic from the primary path to a secondary path (e.g., a protection path) if the primary path fails to meet one or more network performance criteria.

Communications networks are often configured as an Optical Transport Network (OTN) as defined by ITU Telecommunication Standardization Sector (ITU-T) Recommendations G.709 and G.798, and a plurality of related standards as referenced by the said recommendations. A particular OTN may include a plurality of network elements for carrying traffic between two or more clients. The G.709 and G.798 standards allow for delay measurements along a path from a first network element to a second network element, and from the second network element back to the first network element.

SUMMARY

A network element is disclosed. In accordance with one embodiment of the present disclosure, a network element may comprise a network interface configured to communicatively couple to a network, and a controller communicatively coupled to the network interface. The controller may be configured to determine a delay-measurement interval, and to perform a plurality of delay measurements at a respective plurality of randomly determined times within the delay-measurement interval. Performing a delay measurement may comprise sending an outgoing signal, receiving an incoming signal, and determining a delay time based on the outgoing signal and the incoming signal.

In accordance with another embodiment of the present disclosure, a method for measuring network delay comprises determining a delay-measurement interval, and performing a plurality of delay measurements at a respective plurality of randomly determined times within the delay-measurement interval. Performing a delay measurement may comprise sending an outgoing signal from a network element, receiving an incoming signal at the network element, and determining a delay time based on the outgoing signal and the incoming signal.

In accordance with another embodiment of the present disclosure, a non-transitory computer-readable memory may comprise instructions operable, when executed, to determine a delay-measurement interval, and to perform a plurality of delay measurements at a respective plurality of randomly determined times within the delay-measurement interval. Performing a delay measurement may comprise sending an outgoing signal from a network element, receiving an incoming signal at the network element, and determining a delay time based on the outgoing signal and the incoming signal.

In accordance with another embodiment of the present disclosure, a network element may comprise a network interface configured to communicatively couple to a network, and a controller communicatively coupled to the network interface. The controller may be configured to send an outgoing signal and an outgoing-delay-signal identifier, receive an incoming signal and an incoming-delay-signal identifier, determine whether the incoming-delay-signal identifier corresponds to the outgoing-delay-signal identifier, and determine a delay time based on the outgoing signal and the incoming signal.

It is to be understood that both the foregoing general description and the following detailed description are exemplary and explanatory and are not restrictive of the invention, as claimed.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION

Figure 1:
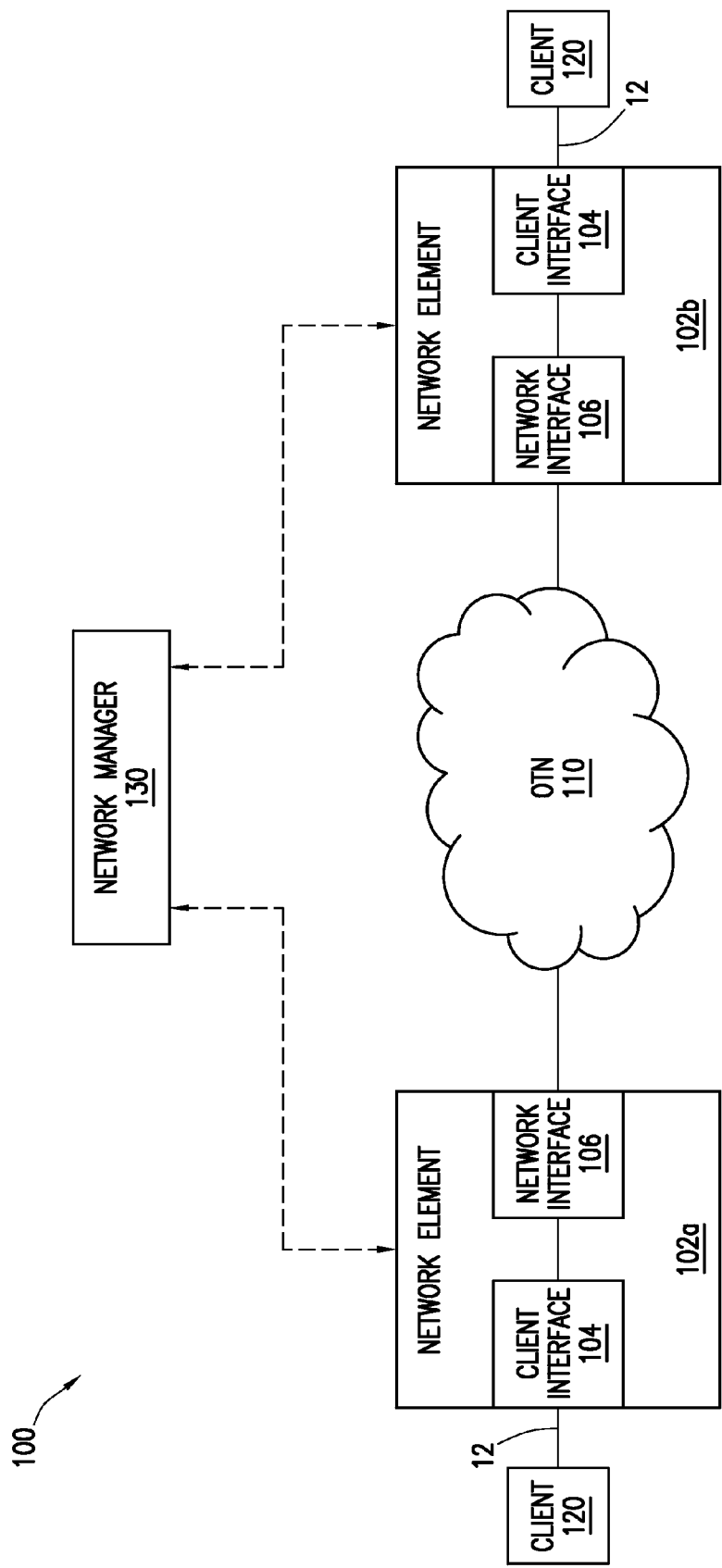
FIG. 1 illustrates a block diagram of an example network, in accordance with the teachings of the present disclosure.

FIG. 1 illustrates a block diagram of an example network 100, in accordance with the teachings of the present disclosure. Network 100, may include transmission media 12, one or more clients 120, one or more network elements 102, a network manager 130, and an Optical Transport Network ("OTN") 110.

In some embodiments, network 100 may be configured to communicate information or "traffic." As used herein, "traffic" means information transmitted, stored, or sorted in network 100. In some embodiments, network 100 may be configured to communicate network traffic from a first client 120 to a second client through one or more network element 102 and OTN 110.

Transmission medium 12 may include any system, device, or apparatus configured to communicatively couple client 120 to network element 102. For example, a transmission medium 12 may include an optical fiber, an Ethernet cable, a T1 cable, a WiFi signal, a Bluetooth signal, or other suitable medium. Traffic from client 120 to network element 102 may be communicated in any suitable form. For example, traffic from client 120 to network element 102 may comprise optical and/or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated via transmission media 12 may be structured in any appropriate manner including, but not limited to, being structured in frames, packets, or an unstructured bit stream. As used herein, the term "datagram" may refer to a frame, packet, or other data structure for transmission of traffic.

Each network element 102 in network 100 may comprise any suitable system operable to transmit and receive traffic. In some embodiments, network element 102 may include a multitude of interfaces (e.g., client interface 104 and network interface 106) in order to communicate with other components of network 100.

In some embodiments, network element 102 may be communicatively coupled to client 120 via transmission media 12. In such embodiments, client interface 104 may provide an interface between network element 102 and one or more clients 120 (e.g., customers). In some embodiments, client 120 may be a customer of a network service provider. For example, client 120 may be a personal computer or a consolidated node that may provide access to network 100 for one or more personal computers to network 100. In some embodiments, client 120 may represent other network elements that may communicatively couple to another network. For example, network 100 may be nested within an outer network and client 120 may represent network elements that interface with the outer network.

Network element 102 may be operable to transmit traffic directly to one or more other network elements 102 and receive traffic directly from the one or more other network elements 102. In some embodiments, client interface 104 may comprise an Ethernet port, an optical port, or any other suitable port to communicate with client 120 and/or other network elements according to any suitable transmission protocol or standard. Moreover, client interface 104 may be implemented in any suitable manner. For example, client interface 104 may be implemented using hardware, software, or any combination thereof.

Network element 102 may also perform datagram segmentation, reassembly, and other tasks in order to convert traffic (e.g., Ethernet packets) received from client 120 to frames (e.g., OTN frames) for communication via OTN 110, and vice versa. Network element 102 may include network interface 106, which may be operable to transmit such converted traffic to OTN 110. In some embodiments, network interface 106 may comprise a plurality of interfaces and/or ports (e.g., optical ports), allowing for redundant paths to be established between network element 102a and network element 102b.

Network element 102 may include any suitable arrangement of components operable to perform the operations of the network element 102. As an example, network element 102 may include logic such as hardware, software, other logic, and/or any other suitable combination of the preceding. Logic may include any suitable device operable to execute instructions and manipulate data to perform operations, for example, a processor, microprocessor, field-programmable gate array (FPGA), or application specific integrated circuit (ASIC). Network element 102 may include an interface operable to receive input, send output, process the input and/or output, or any combination of the preceding. An interface may include ports, conversion software, or both. Network element 102 may include memory, such as, logic operable to store and facilitate retrieval of information. Memory may include Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding, and/or any other suitable components.

In certain embodiments of the present disclosure, network element 102 may be configured to transmit optical signals through network 100 in specific wavelengths or channels.

Network element 102 may include any system, apparatus or device configured to convert an electrical signal into an optical signal and transmit the optical signal. For example, network element 102 may each comprise a laser and a modulator configured to receive electrical signals and modulate the information contained in the electrical signals onto a beam of light produced by the laser at a particular wavelength and transmit the beam carrying the signal throughout the network. Network element 102 may include client cards, switches, such as, optical transport network (OTN) switches, line cards, one or more multiplexers, one or more amplifiers, one or more reconfigurable optical add/drop multiplexers, and/or one or more receivers.

OTN 110 may include any OTN system configured to switch, forward, and/or route traffic between network elements 102. OTN 110 may comprise a plurality of optical nodes and/or network elements each configured to provide switching, forwarding, and/or routing functionality. OTN 110 may be configured as a mesh network, a ring network, a point-to-point network, or any other suitable network or combination of networks. OTN 110 may be used in a short-haul metropolitan network, a long-haul inter-city network, or any other suitable network or combination of networks. OTN 110 may represent all or a portion of a short-haul metropolitan network, a long-haul inter-city network, and/or any other suitable network or combination of networks. In some embodiments, OTN 110 may employ a protection methodology to provide redundancy protection in the event of a failure. To provide protection, OTN 110 may employ unidirectional path-switched ring (UPSR), bi-directional line-switched ring (BLSR), automatic protection switching (APS), or another suitable protection scheme.

Traffic may be transmitted by network elements 102 across OTN 110 according to various protocols such as ITU G.709 and ITU G.789. Network elements 102 may transmit traffic in data packets or frames known as Optical channel Transport Unit (OTU) frames. The OTU frames may include an Optical channel Data Unit (ODU) signal within the OTU. The ODU may have a particular signal structure based on bandwidth, for example, ODU0, ODU1, ODU2, ODU2e, ODU3, ODU4, ODU5, and ODUflex. These may be collectively referred to as ODUk. Some ODU signals may be high order ODUs (HO-ODU) and others may be low order ODUs (LO-ODUs). A HO-ODU may include more than one LO-ODU. For example, an ODU1 signal may carry two ODU0 signals, or one ODU2 signal may carry eight ODU0 signals or four ODU1 signals. Alternatively, an ODU2 signal may carry a combination such as two ODU0 signals and three ODU1 signals. Each single ODU0 signal may be referred to as a tributary slot (TS). For example, an ODU2 signal may include up to eight TSs. Within a wavelength there may be HO-ODUs that have TSs and each TS or a combination of TSs may be a channel to carry information.

Network 100 may include a management or control plane as well as a transport plane. The management or control plane may be used generally for administration and management of network 100, while the transport plane may be used generally for transmission of data through network 100.

Network 100 may include network manager 130, which may form part of a management or control plane. Network manager 130 may be configured to monitor and/or manage operations pertaining to the flow of traffic from one network element 102 to another network element 102 via OTN 110. For example, as described in further detail below with reference to FIG. 2, a first network element may be configured to initiate and perform a delay measurement between the first network element (e.g., network element 102a) and a second network element (e.g., network element 102b). Such a delay measurement may be the round-trip time for a signal to travel from a first network element (e.g., network element 102a) to a second network element (e.g., network element 102b), and back to the first network element. The first network element may then report the delay measurement to network manager 130. If the delay measurement does not meet a desired timing criteria, network manager 130 may institute network 100's protection methodology. For example, network manager 130 may instruct network element 102a and network element 102b to switch from communicating via a primary path to communicating via a redundant protection path. In some embodiments, such a redundant protection path may be an alternative path within OTN 110, and in some embodiments, such a redundant protection path may be an alternative path outside of OTN 110.

Figure 2:
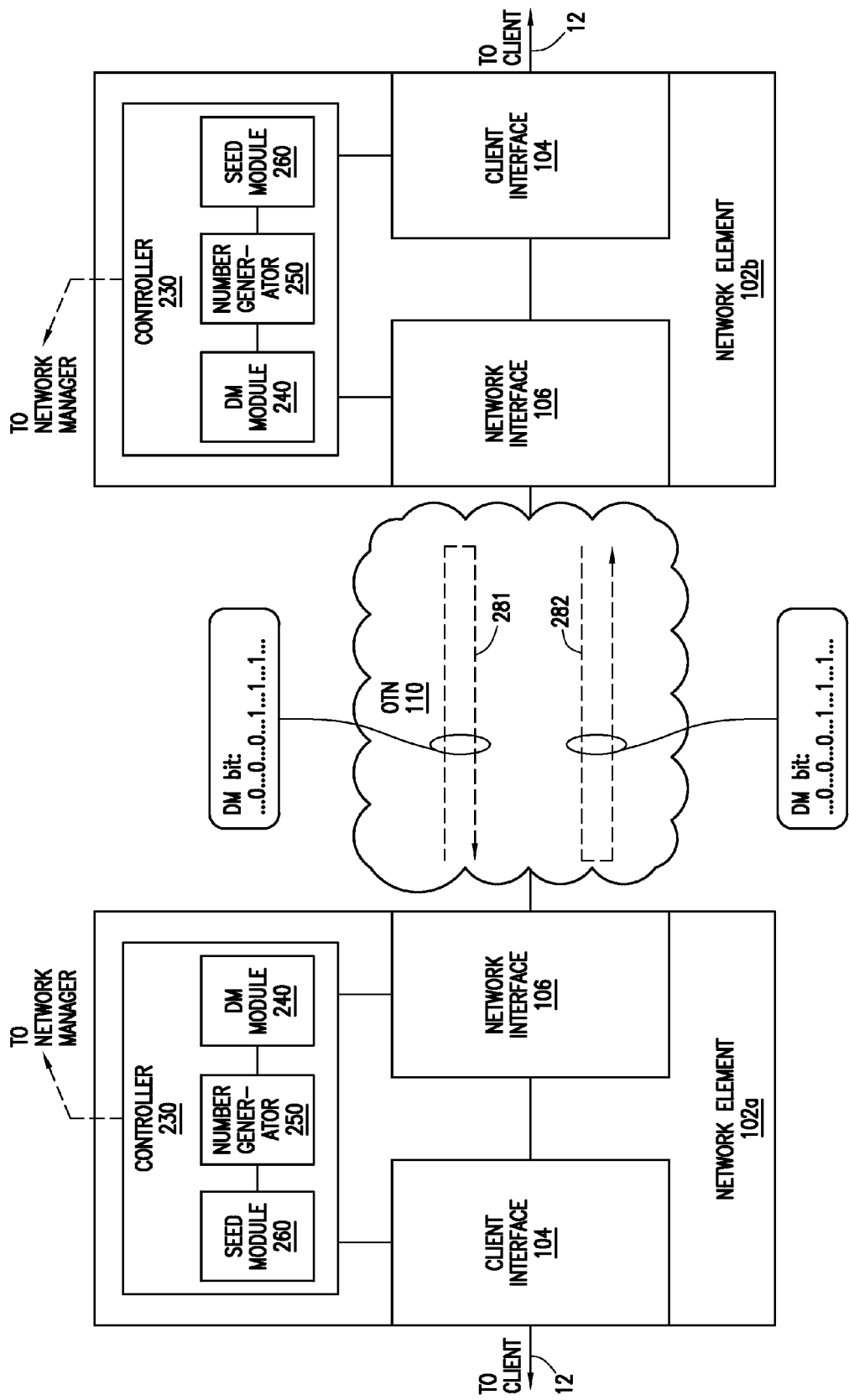
FIG. 2 illustrates a block diagram depicting the communication of delay-measurement signals between network elements, in accordance with the teachings of the present disclosure.

FIG. 2 illustrates a block diagram depicting the communication of delay-measurement signals between network elements 102a and 102b, in accordance with the teachings of the present disclosure. As shown in FIG. 2, each network element 102 may include a controller 230 in addition to client interface 104 and network interface 106. Controller 103 may include any suitable system, apparatus, or device configured to manage network element 102, including, as described in further detail below, the performance of delay measurements. Controller 103 may include any system, device, or apparatus configured to store, interpret, and/or execute program instructions, and/or process data, and may include, without limitation a memory, microprocessor, microcontroller, digital signal processor (DSP), application specific integrated circuit (ASIC), or any other digital or analog circuitry configured to store, interpret and/or execute program instructions and/or process data.

Controller 230 may be configured to initiate and/or perform a network delay measurement according to any suitable standard or protocol. In some embodiments, one or more bits within a data packet or a frame (e.g., an OTU frame) may be designated as a delay measurement bit ("DM bit"). In some embodiments, data packets or frames that support tandom connection monitoring ("TCM") may include a bit designated as a DM bit for each hierarchical level of a network that may be monitored. A delay measurement signal, such as signal 281 or signal 282, may include a transition in the logic value (from logic 0 to logic 1, or vice versa) of the DM bit in a stream of frames. For example, prior to a delay measurement, network element 102a may transmit a stream of frames to network element 102b with the DM bit set to logic 0, and network element 102b may transmit a stream of frames to network element 102a with the DM bit set to logic 0. Signal 281 may be initiated from network element 102a with a transition of the DM bit from logic 0 to logic 1 in the stream of frames from network element 102a to network element 102b. Signal 281 may travel to network element 102b and back to network element 102a via OTN 110. The return of signal 281 (e.g., the transition of the DM bit from logic 0 to logic 1 in the stream of frames from network element 102b to network element 102a) may end the delay measurement. Controller 230 may then calculate a two-way delay measurement based on the time it took for signal 281 to travel from network element 102a to network element 102b and back to network element 102a. Though signals (e.g., signal 281) may be referred to herein as being sent from or received by network elements (e.g., network element 102a), for the purposes of the present disclosure, signals such as signal 281 may also be referred to as being sent from and being received by portions of network element 102 such as network interface 106 and/or controller 230.

The above described DM bit and delay measurement signals may be implemented with any suitable bit and/or any suitable signal according to any suitable protocol or standard. In some embodiments, the value of the DM bit may be maintained after a delay measurement until the start of the next delay measurement. For example, during a first delay measurement test, signal 281 may include a transition of the DM bit from logic 0 to logic 1. After the first delay measurement test is complete, the DM bit may remain at logic 1 until the start of a second delay measurement test. Subsequently, during a second delay measurement test, signal 281 may include a transition of the DM bit from logic 1 to logic 0.

Network element 102b may be configured to perform a delay measurement in the same manner as described above for network element 102a. For example, signal 282 may represent a transition in the DM bit from logic 0 to logic 1 or vice versa. Moreover, signal 282 may be transmitted from network element 102b to network element 102a, and back to network element 102b. Accordingly, network element 102b may then calculate a two-way delay measurement based on the time it took for signal 282 to travel from network element 102b to network element 102a and back to network element 102b.

In some embodiments, network elements 102a and 102b may be configured to perform on-demand delay measurements. For example, in some embodiments, network elements 102a and 102b may perform delay measurements in response to receiving a request for a delay measurement from network manager 130. After performing the requested delay measurement, controller 230 may report the delay time back to network manager 130. Network elements 102a and 102b may also be configured to perform proactive delay measurements. For example, network elements 102a and 102b may be configured to automatically initiate and perform delay measurements at regular intervals and to report the results to network manager 130. The interval may be set to any suitable time (e.g., fifteen minutes or twenty-four hours) in order to provide network manager 130 with a snapshot of the network's performance during that time frame.

Network manager 130 may request on-demand delay measurements from network element 102a and network element 102b at sufficiently separate times in order to prevent the respective on-demand delay measurements by the different network elements 102 from interfering with each other. However, network manager 130 may not have such control over proactive delay measurements initiated by and performed by network elements 102a and 102b.

If network element 102a and network element 102b initiate delay measurements at or near the same time as each other, one or both of the delay measurements may be corrupted. For example, in one scenario, prior to the performance of delay measurements, the DM bit in a stream of frames from network element 102a to network element 102b may be set to logic 0. Likewise, the DM bit in a stream of frames from network element 102b to network element 102a may be set to logic 0. Network element 102a may initiate a delay measurement and may send signal 281 (e.g., a transition of the DM bit from logic 0 to logic 1) to network element 102b. In response to sending signal 281 to network element 102b, network element 102a may anticipate the return of signal 281 from network element 102b. However, at or near the same time that network element 102a initiated its delay measurement, network element 102b may initiate a delay measurement and may send signal 282 (e.g., a transition of the DM bit from logic 0 to logic 1) to network element 102a. In some embodiments, network element 102a may not be configured to distinguish between the DM bit transition of signal 282 and the DM bit transition of signal 281. Accordingly, if signal 282 is received by network element 102a before signal 281 returns to network element 102a, network element 102a may incorrectly interpret signal 282 as the end point of its delay measurement. Likewise, if signal 281 is received by network element 102b before signal 282 returns to network element 102b, network element 102b may incorrectly interpret signal 281 as the end point of its delay measurement.

The corrupted delay measurements in the above scenario may be shorter than the actual delay. For example, if both delay measurements are initiated at the same time, network element 102a may calculate a delay equivalent to the time it took signal 282 to travel from network element 102b to network element 102a, rather than the would-be round trip time of signal 281. Likewise, network element 102b may calculate a delay equivalent to the time it took signal 281 to travel from network element 102a to network element 102b, rather than the would-be round trip time of signal 282. Such an occurrence, resulting in incorrect delay measurements, may be referred to as "glare."

Controller 230 may be configured to eliminate or reduce probability of glare. In some embodiments, glare may be eliminated through the use of one or more additional bits that may identify the source of a signal, or by employing a plurality of protocols in the signal being used to identify the source. Such bits may be referred to herein as delay-ID bits. For example, one or more delay-ID bits in, or otherwise associated with, a stream of frames containing a DM bit, may identify the network element 102 from which a signal comprising a transition of the DM bit originated. Using the one or more delay-ID bits, a transition of the DM bit in one signal (e.g., signal 281) may be distinguished from the transition of the DM bit in another signal (e.g., signal 282).

In some embodiments, controller 230 may monitor the delay-ID bits, and may discard any corrupted delay measurements. For example, in a situation where signal 282 improperly triggers the end of a delay measurement by network element 102a, controller 230 at network element 102a may read the delay-ID bit of signal 282 and determine that the delay measurement was improper. In some embodiments, controller 230 may then discard the corrupted delay measurement and initiate another delay measurement. Such a process may be repeated until a proper delay measurement occurs. In some embodiments, controller 230 may monitor the delay-ID bits to prevent a corrupted delay measurement before such a delay measurement occurs. For example, after network element 102a and controller 230 transmit an outgoing signal 281, network element 102a and controller 230 may anticipate receiving an incoming signal. If the incoming signal at network element 102a is, for example, signal 282, which did not originate at network element 102a, controller 230 may decline to determine a delay time based on the transmitted outgoing signal 281 and the received incoming signal 282.

The delay-ID bits may be implemented in any suitable manner. For example, one or more otherwise unused bits in a frame or packet, or any other data bit or a plurality of bits which are not encapsulated in a frame or a packet structure, could be designated as the delay-ID bit. As another example, additional one or more bits could be associated with and/or transmitted with a frame or a packet, and could be designated as the one or more delay-ID bits.

In some embodiments, controller 230 may be configured to reduce the probability of glare and/or the probability of reporting an improperly small delay measurement to network manager 130. In some embodiments, controller 230 may include a delay measurement module 240, a random number generator 250, and a seed module 260.

As described above, controller 230 and delay measurement module 240 may be configured to proactively perform delay measurements at any time interval. For example, proactive delay measurements may occur every fifteen minutes. As another example, proactive delay measurements may occur every twenty-four hours. Successful delay measurements may require a relatively short amount of time as compared to, for example, a fifteen-minute interval. For example, an upper threshold for an acceptable two-way delay from a first network element 102a to a second network element 102b, and back to the first network element 102a, may be in the range of approximately five seconds or less. In some embodiments, acceptable two-way delays may be greater or lesser than approximately five seconds, depending on the length of the path between the first network element 102a and the second network element 102b.

As described above, glare may occur when two network elements 102 at opposing ends of a measurement path initiate delay measurements at or near the same time, meaning that the time difference between the initiation of delay measurement by two network elements is less than a one-way delay of the path between them, such that the second network element that initiates a delay measurement is not yet aware of the fact that delay measurement has already been initiated by the first one. To reduce the probability that delay measurements are initiated by opposing network elements 102 at or near the same time, the timing of one or more delay measurements initiated at network elements 102 within a given delay-measurement interval may be randomized. For example, delay measurement module 240 may determine the timing of one or more delay measurements within a fifteen minute interval based on a number generated by random number generator 250. Random number generator 250 may include any suitable system, program, process, algorithm, and/or module configured to randomly generate a number based on a seed value. Seed module 260 may provide such a seed value to random number generator 250. In some embodiments, seed module 260 may be configured to determine a seed number that is unique compared to seed numbers in other instantiations of network element 102 within a network. For example, the seed value generated by seed module 260 in network element 102a may be different than the seed value generated by seed module 260 in network element 102b. Accordingly, the probability of network element 102a and network element 102b initiating delay measurements at or near the same time may be reduced. Thus, the probability of experiencing glare may be reduced.

In some embodiments, a single network element 102 may include multiple network interfaces 106 and may support multiple delay-measurement paths. For such embodiments, the uniqueness of a seed for each delay-measurement path may be maintained through the incorporation of a unique interface identification number as at least a portion of the seed number for each supported delay-measurement path. For example, a unique port number for each of the multiple delay-measurement paths may be used as part of a unique seed number for the timing of delay measurements for each delay-measurement path extending from network element 102.

In some embodiments, controller 230 and delay measurement module 240 may be configured to perform and/or report the results of more than one delay measurement during a given interval. For example, delay measurement module 240 may be configured to initiate and to perform two, three, four, five, or any other suitable number of delay measurements in a fifteen-minute interval. Delay measurement module 240 may determine which of the multiple delay measurements had the largest value. Because glare results in an incorrectly small delay measurement, all of the multiple delay measurements would have to experience glare in order for the largest measured delay time to suffer from glare. The probability that the reported largest delay measurement suffered from glare may thus be reduced according to the following equation:

$$P=g^n$$

where "g" is the probability (from 0 to 1) that glare interfered with any single delay measurement, "n" is the number of delay measurements taken within the given interval, and "P" is the probability that the largest of the "n" number of delay measurements suffered from glare.

As described above, in some embodiments, controller 230 may be configured to report only the largest of the multiple delay measurements for a given interval to network controller 130. However, in some embodiments, controller 230 may be configured to report each of the multiple delay measurements to network manager 130. Network manager 130 may in turn be configured to perform one or more of its monitoring and control functions based on the largest of the multiple proactive delay measurements for a given interval. For example, if one or more delay measurements exceed a maximum delay threshold, network manager 130 may instruct components within network 100 to switch the flow of traffic from a primary path between network elements 102a and 102b to an alternative protection path between network elements 102a and 102b.

Figure 3:
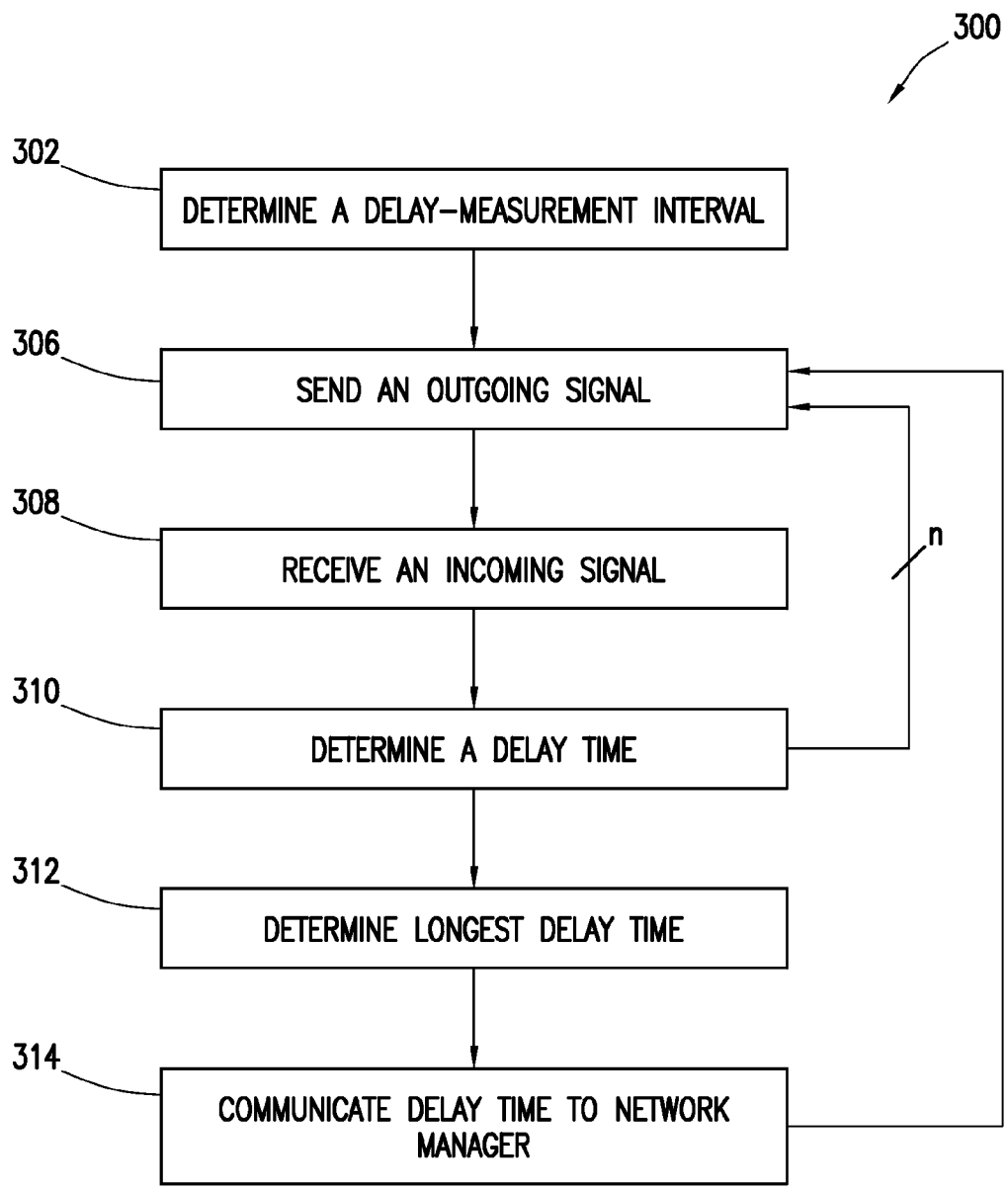
FIG. 3 depicts a flow chart of an example method for measuring network delay, in accordance with the teachings of the present disclosure.

FIG. 3 depicts a flow chart of an example method 300 for measuring network delay, in accordance with the teachings of the present disclosure.

At step 302, a delay-measurement interval may be determined. In some embodiments, controller 230 may determine a delay-measurement interval of fifteen minutes. Steps 306 through 314 may then be executed during such a time interval.

After 302, steps 306 through 310 may be executed in order to perform a delay measurement during the delay-measurement interval. Controller 230 may perform such a delay measurement at a randomly determined time, which may be based on a number provided by random number generator 250 and a unique seed value provided by seed module 260.

At step 306, an outgoing signal may be sent. For example, network element 102a may send signal 281 to network element 102b via OTN 110. In some embodiments, after network element 102a sends signal 281, network element 102a may anticipate the return of signal 281.

At step 308, an incoming signal may be received. In some situations, network element 102a may receive the returning signal 281. In other situations, e.g., those in which glare may occur, network element 102a may receive signal 282 and may not be capable of distinguishing between signal 282 and the anticipated signal 281.

At step 310, a delay time may be determined based on the outgoing signal and the incoming signal. For example, the delay time may be calculated based on the difference from the time that signal 281 was sent during step 306 and the time that signal 281 was received during step 308.

Step 306 through step 310 may be repeated any suitable number of times. For example, controller 230 may be configured to perform five delay measurements at five respective randomly determined times within each fifteen-minute delay-measurement interval. In such embodiments, step 306 through step 310 may be repeated five times.

At step 312, the largest delay time may be determined. For example, if five delay times are determined during the performance of five delay measurements (e.g., five iterations of steps 306-310) in a delay-measurement interval, controller 230 may determine which of the five delay times is the largest. Because glare may cause an incorrectly short delay time, the largest of five delay times would only be affected by glare in the highly improbable case whereby each of the five delay measurements were affected by glare. Assuming that "g" is the probability (from 0 to 1) of glare occurring during a single delay-measurement, the combined probability of glare occurring during all five delay measurements would be $g^5$. This combined probability may, in some embodiments, be negligible. Accordingly, a practically glare-free proactive glare measurement may be provided.

At step 314, one or more delay times may be communicated to a network manager or stored for communication at a later time. For example, controller 230 may send to network manager 130 the largest delay time for the delay-measurement interval as determined in step 312. The delay measurement can also be used for other actions such as one or more event triggers. In some embodiments, such events may be a plurality of actions that can be determined or operated by the measured delay. In some embodiments, controller 230 may send to network manager 130 each of the multiple delay times measured during the delay-measurement interval. In such embodiments, network manager 130 may in turn be configured to determine the longest of the multiple delay times, and to perform one or more monitoring and/or control functions based on the longest of the multiple delay times.

After steps 302 through 314 are complete, some or all of steps 302 through 314 may be repeated any suitable number of times. For example, steps 306 through 310 may be repeated another five times during a second fifteen-minute delay-measurement interval. The longest delay time for the second delay-measurement interval may then be determined at step 312 and communicated to network manager 130 at step 314.

Although FIG. 3 discloses a particular number of steps to be taken with respect to method 300, method 300 may be executed with greater or lesser steps than those depicted in FIG. 3. For example, method 300 may be executed without step 312. In addition, although FIG. 3 discloses a certain order of steps to be taken with respect to method 300, the steps included in method 300 may be completed in any suitable order. For example, step 308 and step 310 may occur simultaneously.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A network element, comprising:
 a network interface configured to communicatively couple to a network; and
 a controller communicatively coupled to the network interface and configured to:
  determine a delay-measurement interval;
  determine each of a plurality of randomly generated times within the delay-measurement interval based on a unique interface identification number; and
  perform a plurality of delay measurements respectively at the plurality of randomly generated times within the delay-measurement interval, wherein performing a delay measurement comprises:
   sending an outgoing signal;
   receiving an incoming signal; and
   determining a delay time based on the outgoing signal and the incoming signal.

2. The network element of claim 1, wherein the network interface is configured to communicatively couple to an Optical Transport Network (OTN).

3. The network element of claim 1, wherein the controller is further configured to:
 determine a largest delay time for the delay-measurement interval based on a plurality of delay times corresponding to the plurality of delay measurements; and
 communicate the largest delay time to a network manager.

4. The network element of claim 1, wherein the controller is further configured to communicate each of a plurality of delay times for the delay-measurement interval to a network manager.

5. The network element of claim 1, wherein the controller is further configured to perform a second plurality of delay measurements during a second delay-measurement interval.

6. A method for measuring network delay, comprising:
 determining a delay-measurement interval;
 determining each of a plurality of randomly generated times within the delay-measurement interval based on a unique interface identification number; and
 performing a plurality of delay measurements respectively at the plurality of randomly generated times within the delay-measurement interval, wherein performing a delay measurement comprises:
  sending an outgoing signal from a network element;
  receiving an incoming signal at the network element; and
  determining a delay time based on the outgoing signal and the incoming signal.

7. The method of claim 6, wherein:
 sending the outgoing signal from the network element comprises sending the outgoing signal from the network element to an opposing network element through an Optical Transport Network (OTN); and
 receiving the incoming signal at the network element comprises receiving the incoming signal at the network element from the opposing network element through the OTN.

8. The method of claim 6, further comprising:
 determining a longest delay time for the delay-measurement interval based on a plurality of delay times determined during the plurality of delay measurements; and
 communicating the longest delay time to a network manager.

9. The method of claim 6, further comprising communicating each of a plurality of delay times for a delay-measurement interval to a network manager.

10. The method of claim 6, performing a second plurality of delay measurements during a second delay-measurement interval.

11. Non-transitory computer-readable memory comprising instructions operable, when executed, to:
 determine a delay-measurement interval;
 determine each of a plurality of randomly generated times within the delay-measurement interval based on a unique interface identification number; and
 perform a plurality of delay measurements respectively at the plurality of randomly generated times within the delay-measurement interval, wherein performing a delay measurement comprises:
  sending an outgoing signal from a network element;
  receiving an incoming signal at the network element; and
  determining a delay time based on the outgoing signal and the incoming signal.

12. The non-transitory computer-readable memory of claim 11, wherein:
 sending the outgoing signal from the network element comprises sending the outgoing signal from the network element to an opposing network element through an Optical Transport Network (OTN); and
 receiving the incoming signal at the network element comprises receiving the incoming signal at the network element from the opposing network element through the OTN.

13. The non-transitory computer-readable memory of claim 11, wherein the instructions are further operable, when executed, to:
 determine a longest delay time for the delay-measurement interval based on a plurality of delay times determined during the plurality of delay measurements; and
 communicate the longest delay time to a network manager.

14. The non-transitory computer-readable memory of claim 11, wherein the instructions are further operable, when executed, to communicate each of a plurality of delay times for a delay-measurement interval to a network manager.

15. The non-transitory computer-readable memory of claim 11, wherein the instructions are further operable, when executed, to perform a second plurality of delay measurements during a second delay-measurement interval.

* * * * *